3,211,694
PROCESS OF COLORING POLYAMIDES IN THE MELT WITH PIGMENT DYESTUFFS
Hans Altermatt, Reinach, Basel-Land, Switzerland, assignor to Ciba Limited, Basel, Switzerland, a company of Switzerland
No Drawing. Filed Apr. 19, 1961, Ser. No. 103,986
Claims priority, application Switzerland, May 19, 1960, 5,763/60
1 Claim. (Cl. 260—37)

Organic pigment dyestuffs must satisfy different demands depending upon the manner in which they are applied. The most stringent demands as to stability are made on a pigment to be used for spin-dyeing high-melting organic substances, such, for example, as linear polyesters, polyethylene or polypropylene and more especially superpolyamides. Owing to the fact that hitherto no organic pigments for dyeing yellow tints were available that satisfied the aforementioned stringent demands, inorganic pigments were preponderantly used for this purpose. However, these inorganic pigments have the disadvantage that they produce weak dyeings and in addition fibers dyed therewith are of a rather dull shade. It has therefore been attempted to replace the inorganic pigments by organic pigments.

Accordingly, the present invention constitutes a valuable advance in the art; it is based on the observation that compounds that are free from groups imparting solubility in water and correspond to the formula (1)
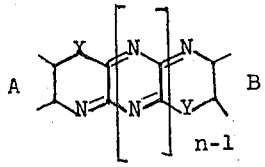

where A and B each represents an arylene radical, more especially a benzene radical; n is a whole number from 1 to 6, more especially 1, 2 or 3; X and Y each represents an oxygen or sulfur atom or a group of the formula

(in which R represents a hydrogen atom or an alkyl, cycloalkyl, aralkyl or aryl group)—are excellently suitable for dyeing organic products in the mass.

Of special value are those dyestuffs of the Formula 1 where X and Y each represents an NH group. The simplest compounds corresponding to the Formula 1, as well as their benz- and dibenz derivatives, are known, readily accessible compounds, namely (2)
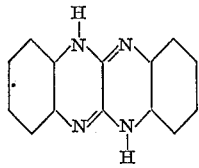
Fluoflavine and (3)
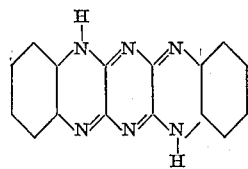
Fluorubin Hinsberg: Ber. 29, page 784 [1896]. Hinsberg: Ber. 36, page 4048 [1903]. However, said author does not mention any purpose to which these compounds may be applied. In PB-Report 70 337 on page 8521 it is stated that while the sulfonation products of fluoflavine have good affinity for wool, the resulting dyeings are of very poor fastness to light. Since, as a rule, sulfonation rather increases the fastness to light of a dyestuff, it should have been expected that unsulfonated fluoflavine would have a particularly poor fastness to light. Surprisingly it was found, however, that fluoflavine and its homologues display very good fastness to light in a variety of substrata. Apart from the compounds mentioned above reference may also be made to the compound of the formula (4)
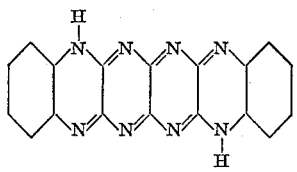

which has not yet been described in the literature. Likewise suitable are derivatives in which the arylene radicals A and B are substituted, for example by halogen atoms such as chlorine or bromine, or by alkyl, alkoxy, nitro or amino groups. As examples of dyestuffs substituted at the nitrogen atoms there may be mentioned the compounds of the formulae

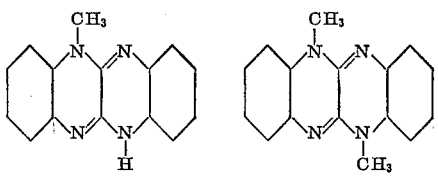

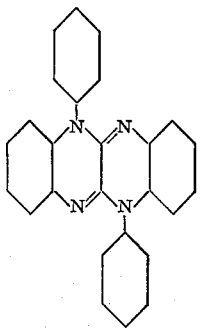

Instead of an

group (where R represents a hydrogen atom or an alkyl, cycloalkyl, aralkyl or aryl group) the compounds may contain, for example, an oxygen atom or more especially a sulfur atom, as is the case for example with the compounds of the formulae

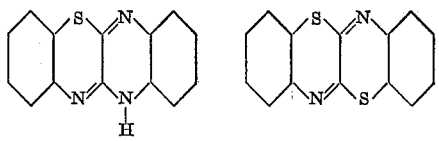

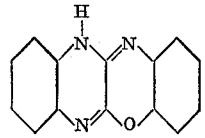

As examples of materials that can be dyed by the present process there may be mentioned plastic products such as rubber, casein, polymerisation resins such as polyvinyl chloride and copolymers thereof, polyvinyl acetals, polyethylene, polypropylene, polystyrene and copolymers thereof with polyesters of unsaturated dicarboxylic acids with diols, polyacrylates and copolymers thereof, silicone and silicone resins. The pigments to be used in the present process are further suitable for the manufacture of colored condensation resins, more especially aminoplasts, for example urea-formaldehyde or melamine-formaldehyde resins, polyaddition resins such as epoxy, polyurethane or alkyd resins, as well as for the manufacture of colored lacquers containing one or several of the aforementioned resins in an organic solvent, or aqueous emulsions containing one or several of the aforementioned resins or precondensates, if desired in the presence of an organic solvent, for example an oil-in-water or water-in-oil emulsion. Such emulsions are primarily suitable for impregnating or printing textile materials or other flat materials such as paper, leather or glass fiber fabrics, if desired followed by curing at an elevated temperature. The pigments to be used in the present process are also suitable for the manufacture of spin-dyed fibers, for example viscose, cellulose esters or polyacrylonitrile. They can also be used with advantage for the manufacture of cosmetics.

The pigments to be used in the present process, which as a rule result from the synthesis in a physically useful form, are advantageously finely dispersed before application, for example by grinding the crude pigment in the dry or water-moist form with or without addition of an organic solvent and/or of a salt that can be washed out.

The pigments to be used in the present process can be applied either in the pure form as so-called toners or in the form of preparations containing the pigment in a finely dispersed state, the particle diameter advantageously not exceeding 3μ. Such preparations, which may also contain the conventional additives, for example dispersants or binding agents, can be manufactured in known manner by intensive mechanical treatment, for example on roller mills or in suitable kneaders. For this purpose the dispersant which facilitates the intensive working is adapted to the purpose in hand; for example for the manufacture of aqueous dispersible preparations, sulfite waste liquor or a dinaphthylmethane disulfonate will be used, while for the manufacture of acetate rayon spinning solutions a mixture of acetyl cellulose with a small amount of solvent is suitable.

By virtue of the favorable physical form in which the products of the present invention are generally obtained and by virtue of their chemical inertia and good thermostability it is as a rule easy to incorporate them with masses or preparations of the kind referred to above, such incorporation advantageously being carried out at a stage where said masses or preparations are not yet in their final shape. The steps required for the shaping—such as spinning, moulding, curing, casting and cementing—can be readily performed in the presence of the pigments of the invention without thereby impeding any chemical reactions of the substratum, such as further polymerisation, condensations or polyadditions.

The dyestuffs are of special value for dyeing high-melting masses suitable for spinning such, for example, as polyamides, polyesters, polyethylene or polypropylene; the pigments may be added before, during or after the polycondensation or polymerisation respectively.

The following examples illustrate the invention, the parts and percentages being by weight unless otherwise stated.

*Example 1*

99 parts of shredded hexamethylenediamine adipamide are "bread-crumbed" in the dry state with one part of the extremely finely dispersed dyestuff of the formula

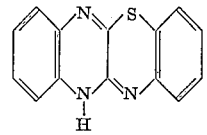

The bread-crumbed shreds are spun by a conventional method, for example by the grid spinning method, at about 290 to 295° C. The resulting filament is of a brilliant yellow color and displays good properties of fastness to light and wetting.

The dyestuff used above was prepared in the following manner: 5 parts of 2:3-dichloroquinoxaline are added at 100 to 110° C. to a suspension of 20 parts of ortho-aminothiophenol and 0.6 part of sodium metal at a rate such that the temperature is maintained by the liberated heat of reaction. The mixture is then stirred for 30 minutes at 140° C., allowed to cool, and the precipitate is suctioned off, thoroughly washed with ether and the sodium chloride formed is then washed out with water.

*Example 2*

99 parts of a shredded hexamethylenediamine adipamide are "bread-crumbed" in the dry state with one part of the extremely finely dispersed fluorubine of the formula

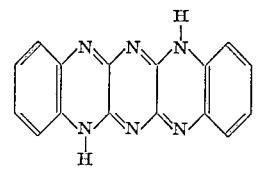

The bread-crumbed shreds are spun by a conventional method, for example by the grid spinning method, at about 290 to 295° C. The resulting filament is of a yellow color and displays good properties of fastness to light and wetting.

When fluorubin is replaced by a mixture of equal parts of fluorubin and copper phthalocyanine, brilliant green dyeings are obtained which do not develop a blue tinge even after prolonged exposure to light.

In the following table a number of further dyestuffs are shown which dye hexamethylenediamine adipamide by the process described above the tints shown in column II.

| I<br>Dyestuff of the formula | | II<br>Tint of dyed polyamide fiber |
|---|---|---|
| 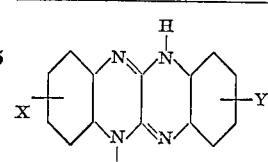<br>in which: | | |
| X | Y | |
| (1) —H | —CH₃ | Yellow. |
| (2) —CH₃ | —CH₃ | Do. |
| (3) —H | —Cl | Do. |
| (4) —Cl | —Cl | Do. |
| (5) —CH₃ | —Cl | Do. |
| (6) —NH₂ | —NH₂ | Greyish blue. |
| (7) 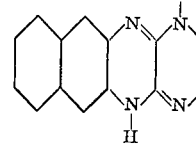 | | Golden yellow. |

| I Dyestuff of the formula | II Tint of dyed polyamide fiber |
|---|---|
| (8) | Golden yellow. |
| (9) | Yellow. |
| (10) | Golden yellow. |
| (11) | Light-yellow. |
| (12) | Yellow. |
| (13) | Do. |
| (14) | Ochre yellow. |
| (15) | Do. |

Instead of a hexamethylenediamine adipamide, it is possible to dye polyamides from ε-caprolactam or ω-amino-undecanoic acid or co-condensates in the mass with the dyestuffs specified above; the spinning temperature depends, of course, on the individual polyamide used. Instead of the dyestuffs as such there may be used dyestuff preparations obtained as described in U.S. patent application Serial No. 812,128, filed May 11, 1959, by Hans Altermatt et al., for example by simultaneous precipitation of a solution of a polyamide and of the pigment from concentrated sulfuric acid.

*Example 3*

99 parts of shredded polyethylene terephthalate are "bread-crumbed" in the dry state with one part of the extremely finely dispersed dyestuff described in Example 2, first paragraph, and then spun from the melt by one of the conventional methods. The polyester filament so obtained is of yellow color and the dyeings possess outstanding fastness properties.

*Example 4*

99 parts of dry shredded polyethylene are mixed with 1 part of extremely finely dispersed dyestuff of the Formula 3. Mouldings are produced from this mixture in an injection moulding machine at 180° C.; the mouldings are of yellow color and possess outstanding properties of fastness.

*Example 5*

One part of the dyestuff of the Formula 3 is extremely finely dispersed in an aqueous medium with a suitable dispersant and the dispersion is used for spin-dyeing 99 parts of viscose by one of the conventional methods. The spun filament displays a yellow shade which possesses outstanding properties of fastness.

*Example 6*

A mixture of 5 parts of fluorubin and 95 parts of dioctyl phthalate is ground in a ball mill until a particle size less than 3μ has been achieved.

0.8 part of this dioctylphthalate paste is mixed with 13 parts of polyvinyl chloride, 7 parts of dioctylphthalate, 0.1 part of cadmium stearate and 1 part of titanium dioxide and then rolled for 5 minutes at 140° C. on a two-roller mill.

The resulting pure yellow dyeing is of good fastness to light and migration.

*Example 7*

A mixture of 40 parts of a nitrocellulose lacquer, 2,375 parts of titanium doixide and 0.125 part of fluorubin is ground for 16 hours in a rod mill. The resulting lacquer is brushed in a thin layer over an aluminum foil. The lacquer coat so produced is of a yellow shade which possesses very good fastness properties.

*Example 8*

A mixture of 25 parts of fluorubin, 25 parts of acetyl cellulose (54.5% combined acetic acid), 100 parts of sodium chloride and 50 parts of diacetone alcohol is worked with cooling in a kneader until the pigment has assumed the desired degree of fineness. 25 parts of water are then added and the whole is kneaded until a finely granular substance has been obtained which is then placed on a suction filter and the sodium chloride and the diacetone alcohol are completely washed out with water. The filter cake is dried in vacuo at 85° and ground in a hammer mill.

1.33 parts of the pigment preparation so obtained are added to an acetate rayon spinning composition consisting of 100 parts of acetyl cellulose and 376 parts of acetone. Stirring for 3 hours completes the distribution of the dyestuff. A filament manufactured in the conventional manner from this composition by the dry-spinning method has a brilliant yellow shade of very good fastness properties.

Example 9

A mixture of 0.25 part of fluorubin, 40 parts of an alkyd-melamine stoving lacquer containing 50% of dyestuff, and 4.75 parts of titanium dioxide is ground for 24 hours in a rod mill. An aluminum foil is brushed with the resulting lacquer in a thin layer and then stoved for one hour at 120° C. The resulting yellow lacquer coat has good fastness to light.

Example 10

A mixture of 4.8 parts of fluoflavine, 4.8 parts of the sodium salt of 1:1'-dinaphthylmethane-2:2'-disulfonic acid and 22.1 parts of water is ground in a ball mill until all dyestuff particles are smaller than 1μ. The pigment suspension obtained in this manner contains about 15% of pigment.

When this aqueous suspension is added to the viscose spinning composition and the mixture is spun in the conventional manner, a yellow cellulose filament of very good fastness properties is obtained.

Example 11

A dye bath is prepared which contains in 1000 parts of water:

15 parts of a polymer latex from 85.8 parts of isobutyl-acrylate, 9.6 parts of acrylonitrile and 4.6 parts of acrylic acid,
15 parts of an emulsion of 70% strength of a methylol-melamine allyl ether emulsified with Turkey red oil and modified with soybean fatty acid,
50 parts of a water-soluble methyl ether of a urea-formaldehyde condensation product in which for every mol of urea more than two mols of formaldehyde have been condensed,
5 parts of the pigment suspension prepared as described in the first paragraph of Example 10, and
20 parts of formic acid of 10% strength.

A dry cotton fabric is immersed at room temperature in the above dyebath, squeezed on a padder until its weight shows an increase of 65 to 80%, dried in the usual manner, if desired under tensoin (clip-stenter or tweeze-stenter) and finally cured for 5 minutes at 145 to 150° C.

The resulting yellow dyeing is distinguished by excellent fastness properties, more especially by its fastness to light.

Example 12

24 parts of fluorubin are kneaded in a kneader with
10 parts of a condensation product from 1 mol of 2:6-ditertiary butylpara-cresol and 15 mols of ethylene oxide.
31 parts of water are added and the dyestuff paste is homogenised on a roller mill. There is then added a lacquer resin emulsion consisting of
7 parts of water and
28 parts of a preparation manufactured as described below, while stirring cautiously. There are obtained 100 parts of a ductile dyestuff paste of good distribution which is excellently suitable for textile printing in combination with aqueous binding agents.

The above preparation can be manufactured in the following manner:

800 parts of a solution of about 70% strength in butanol of a melamine-formaldehyde condensate modified with butanol are emulsified in an aqueous solution containing in 620.4 parts of water 80 parts of purified acid casein free from lactalbumen, 64 parts of urea, 16 parts of thiourea and 9.6 parts of borax. The moderately thickly liquid, finely dispersed emulsion is further mixed with 10 parts of an aqueous ammonia solution of about 25% strength for the purpose of converting the 0.82% of free formaldehyde, which is contained in the resin solution and which during the emulsification migrates into the aqueous phase, into hexamethylenetetramine. The emulsion is diluted with a further 377 parts of water and then subjected to distillation under reduced pressure in a circulation-type of apparatus, about 500 parts of water and about 170 parts of butanol being distilled off. There are obtained about 1310 parts of a stable salve-like preparation which after having been diluted with an equal volume of water displays a pH value of 7.7. 1000 parts of the undiluted emulsion, mixed with about 100 parts of an aqueous ammonium thiocyanate solution of 50% strength, yield a binding agent preparation which lends itself excellently to curing at an elevated temperature.

By the distillation the solvent content of the resin phase is reduced from about 30% to about 10%, while at the same time the total dry solids content of the emulsion is increased from about 45% to about 55%.

Example 13

For making a laminate the following component plies are prepared:

(a) Strong paper of unbleached sulfate cellulose (so-called kraft paper) is impregnated with an aqueous solution of a phenol-formaldehyde resin, expressed and dried.

(b) Paper of pure chemically bleached cellulose containing zinc sulfide or titanium dioxide as filler is impregnated with an aqueous solution of 50% strength of dimethylolmelamine, expressed and dried at 100° C.

(c) 400 parts of a fancy paper of bleached cellulose, containing zinc sulfide or titanium dioxide as filler are disintegrated in a hollander with 10,000 parts of water. The paper pulp obtained in this manner is treated with 30 parts of the pigment suspension obtained as described in Example 10. To fix the pigment 16 parts of aluminum sulfate are added. The dyed fancy paper is impregnated with an aqueous solution of 50% strength of dimethylol-melamine, expressed and dried at 100° C.

(d) When a high-grade laminate is aimed at, the fancy paper is protected with a tissue paper of bleached special cellulose weighing 40 grams per square meter. The tissue paper is likewise impregnated with an aqueous solution of 50% strength of dimethylmelamine, expressed and dried at 100° C.

Sheets of equal size, for example, 2.75 x 12.5 meters, of the materials prepared as described above are placed one on top of the other in the following order: 3 to 5 sheets of paper (a), one sheet of paper (b), one sheet of paper (c), and if desired, one sheet of paper (d) and the sandwich is compressed between mirror-chromed plates for 12 minutes at 140 to 150° C. under a pressure of 100 kg./cm.$^2$, then cooled to 30° C. and the laminate so formed is removed from the press. On one side it is of a yellow shade which has good fastness to light.

What is claimed is:

A process for coloring a polyamide in the melt, wherein there is incorporated in the polyamide a dyestuff of the formula

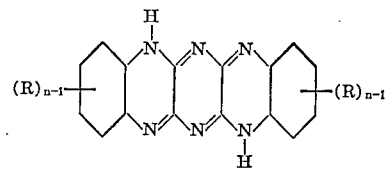

wherein R represents a member selected from the group consisting of halogen atoms, alkyl, alkoxy, nitro and amino groups and $n$ is a whole member from 1 to 3.

References Cited by the Examiner

UNITED STATES PATENTS

| | | | |
|---|---|---|---|
| 2,265,127 | 12/41 | Bolton | 260—37 |
| 2,341,759 | 2/44 | Catlin | 260—37 |
| 2,663,650 | 12/53 | Iler | 106—308 |
| 2,671,788 | 3/54 | Jacob | 260—256.4 |

(Other references on following page)

UNITED STATES PATENTS

| | | | |
|---|---|---|---|
| 2,674,598 | 4/54 | Kryides et al. | 260—256.4 |
| 2,841,504 | 7/58 | Liggett | 106—308 |
| 2,948,721 | 8/60 | Frey | 260—41 |
| 3,003,989 | 10/61 | Ehrhardt et al. | 260—37 |

FOREIGN PATENTS 924,002   4/63   Great Britain.

OTHER REFERENCES

Chemical Abstracts, 16, 3101 (Abstract of Brit. Med. Journal 1922, I, 514–5).

Chemical Abstracts, 19, 530, Abstract of Proc. Soc., London, 96B, 317–33, 1924.

Chemical Abstracts 28: 2718(a) and 19: 1283 and 4. QD 1 AS 1 Ref.

Chemisches Berichte 29: 784 (1896), and 36: 4048–4051 (1903). QD 1 D4.

MORRIS LIEBMAN, *Primary Examiner.*

MILTON STERMAN, *Examiner.*